United States Patent [19]

Peralta et al.

[11] 4,255,197

[45] Mar. 10, 1981

[54] PROCESS FOR OBTAINING REFRACTORY MATERIALS WITH CONTROLLED CHARACTERISTICS OF POROSITY AND DENSITY

[76] Inventors: Antonio L. Peralta, Hacienda de la Carbonera No. 70, Bosques do Echegaray Naucalpan de Juarez, Estado de Mexico; Luis M. C. Eslava, Recife 569-2, Col. Lindavista, Mexico 14, D.F., both of Mexico

[21] Appl. No.: 81,316

[22] Filed: Oct. 3, 1979

Related U.S. Application Data

[63] Continuation-in-part of Ser. No. 40,138, May 18, 1979, abandoned, which is a continuation of Ser. No. 356,134, May 1, 1973, abandoned.

[30] Foreign Application Priority Data

May 4, 1972 [MX] Mexico .................................. 135214

[51] Int. Cl.³ ............................................. C04B 00/00
[52] U.S. Cl. ................................. 106/41; 106/288 B; 264/44; 264/59; 264/317
[58] Field of Search ................ 106/41, 288 B; 264/44, 264/59, 317

[56] References Cited

U.S. PATENT DOCUMENTS

| | | | |
|---|---|---|---|
| 2,553,759 | 5/1951 | Geiger | 106/41 |
| 2,797,201 | 6/1957 | Veatch et al. | 106/40 R |
| 3,176,054 | 3/1965 | Einstein et al. | 264/59 X |
| 3,258,349 | 6/1966 | Scott | 106/41 |
| 3,416,935 | 12/1968 | Einstein et al. | 106/41 |
| 3,855,172 | 12/1974 | Iler et al. | 106/288 B |
| 3,923,940 | 12/1975 | Hujii et al. | 264/59 |
| 4,025,689 | 5/1977 | Kobayashi et al. | 264/44 |

*Primary Examiner*—Helen M. McCarthy
*Attorney, Agent, or Firm*—Roylance, Abrams, Berdo & Farley

[57] ABSTRACT

A process for the preparation of lightweight refractory materials comprising shells or cellular structures comprising the steps of: choosing the size of substrates, wetting the surface of plastic or polymer substrates, mixing the wetted substrates with fine refractory material to form a continuous refractory coating and recovering the said pellets, drying them and burning them to obtain a refractory shell product, for use as an ingredient in refractory product batches.

8 Claims, 4 Drawing Figures

PROCESS FOR OBTAINING REFRACTORY MATERIALS WITH CONTROLLED CHARACTERISTICS OF POROSITY AND DENSITY

This application is a continuation-in-part of application Ser. No. 40,138, filed May 18, 1979, which is a continuation of application Ser. No. 356,134, filed May 1, 1973, both abandoned.

This invention relates to a process for preparing refractory materials having selectable chemical compositions and selectable density and porosity. This invention further relates to refractory products prepared from these refractory materials.

The major portion of refractory products are classified, chemically speaking, as basic refractories, fire clay refractories, high alumina refractories or silica refractories. Basic refractories include those produced from raw materials such as natural magnesite, brucite, synthetic magnesia (often called magnesite), chrome ore, olivine and dolomite. Fire clay refractories are those prepared from refractory fire clays, either raw or calcined or mixtures of both. High alumina refractories are alumina-silica refractories comprising more than 50% alumina and are generally prepared from synthetic alumina, bauxite and mixtures of both. Silica refractories are prepared from high purity silicas.

In addition to the already mentioned products, there exist special refractory products comprising carbon, graphite, zircon, zirconia, silicon carbide and other heat resistant oxides, carbides, nitrides, and materials. The invention described herein relates to all classes of refractory materials, including those briefly outlined above.

Refractory products comprise refractory materials processed in a number of ways to suit various application requirements. For example, refractory products include brick or shapes that are formed by pressing, ramming, or casting. They may be chemically bonded shapes or they may be burned to develop a sintered ceramic bond. Other refractory products may be referred to as monoliths and include castables (refractory concretes), ramming mixes and gunning mixes. The invention described herein relates to all classes of refractory products, including those described above.

Some refractory products utilize in their batch mixtures previously calcined refractory materials in combination with crude refractory materials having a low plasticity and raw materials having plasticity or combinations thereof. The use of the previously calcined materials is necessary in most cases to facilitate manufacturing. Calcined materials tend to be more volume stable on heatup than raw materials such as raw bauxite or clay.

The heat insulating properties of refractory products are improved by decreasing the density of the products. On the other hand, most other desirable properties, such as strength and resistance to metal and slag erosion and/or corrosion are improved by increasing density. Often it is desirable to engineer a refractory product having a particular chemical composition and a particular density to fulfill the requirements of an existing or newly encountered refractories application.

At present, various methods and processes are used for regulating and controlling the density of refractory materials and for regulating and controlling the size and distribution of pores in refractory products.

For example, lightweight aggregates, such as asbestos, diatomaceous earth, vermicullite and perlite in an expanded form may be incorporated in the refractory product batch. Unfortunately, nature does not provide lightweight aggregates in a sufficiently wide range of refractory materials to enable the manufacture of lightweight refractory products in all chemical classifications.

Lightweight refractory materials may form part of a refractory batch mixture which can be processed by known methods and equipment. However, this generally results in a product which changes in dimensions when submitted to the temperatures of ultimate use. Therefore, these products are normally processed at a temperature higher than the one ultimately used and then cut so as to obtain dimensions as may be suitable.

Burn out materials such as sawdust of different types of wood treated with different substances are common pore forming ingredients which unfortunately, when used in a refractory product batch, offer certain manufacturing problems. The use of organic polymers or plastics as burn out materials are known and described in U.S. Pat. Nos. 3,176,054 and 3,416,935.

Recently, processes using chemical agents that produce gases or foams, aqueous suspensions and bubbles have been considered for producing refractory materials and products of low density. The method represents a departure from common manufacturing techniques.

Due to the unavailability in nature of lightweight aggregates of certain compositions and the unsuitability of some of the known processes for producing lightweight products of variable composition, the prior art has not provided suitable methods of engineering the chemical composition and density of all classes of refractories. Principally, some basic refractories, high alumina types, silicon carbide, silica and zircon, which are submitted to temperatures on the order of 1500° C. and more, heretofore could not be suitably processed into controlled density products. The process of the present invention is characterized in manufacturing refractory products of a low density utilizing as raw materials porous refractory materials having a density and porosity as required. These materials may be manufactured of each existing type of refractory materials thus eliminating the problem which the previous mentioned methods could not overcome.

One of the objects of this invention consists in the provision of a process for the fabrication of refractory materials having a cellular structure and/or individual shell structure.

Broadly speaking, the process according to this invention comprises coating solid particles of organic substances having high molecular weight and belonging to the polymerized class hereinafter referred to as plastics or polymers with fine particles of refractory material, then eliminating the solid plastic substrate by means of heat as a result of which the refractory material remains with its cellular structure or individual generally spherical shell structure. The elimination of the solid plastic substrate takes place before the coating pellets have been incorporated in a refractory product batch. The physical properties of the refractory materials are determined by the process as more fully discussed herein. The chemical properties of the structure are determined by the refractory materials utilized for coating the solid particles of the plastic or polymer.

With the process according to this invention, it is possible to prepare particles of refractory material as individual shells or as agglomerates of shells so as to form cellular structures or honeycombs. The shells comprise substantially abutting refractory particles. The shape of the refractory particles (shells) will be determined by the shape of the solid particles of the plastic or polymer substrate used.

The invention is diagrammatically illustrated in the accompanying drawing wherein FIG. 1 illustrates the step of choosing the size of the solid plastic or polymer substrate particles;

Figure 4:
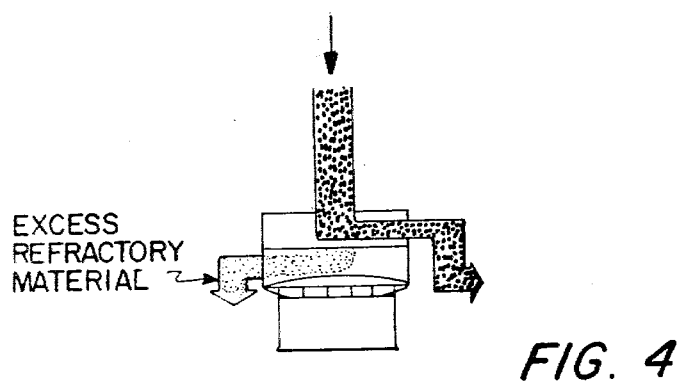

and FIG. 4 illustrates the step of separating the coated substrates from any excess refractory material.

Figure 1:
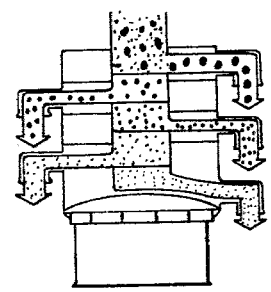

The initial step in the process according to this invention is the selection and sizing of the solid polymer or plastic substrates, see FIG. 1. These polymerized organic substances are, for example, polystyrene, polyamides, polyethylene, polyurethane, vinyl acrylics and so forth. The shape of the plastics or polymers as contemplated by this invention are, for example, hollow spheres of expanded polymer, solid particles in the shape of spheres, solid cylinders, hollow cylinders, prisms, shavings and others. A preferred plastic is an expanded polystyrene bead. For most purposes, it is preferred that the plastic or polymer particles are less than ½ inches in breadth and greater than 28 mesh Tyler. In the most practical applications of this invention the plastic particles fall between 4 and 28 mesh Tyler screen series.

Figure 2:
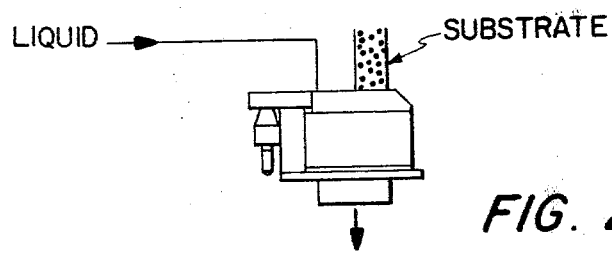
FIG. 2 illustrates the step of wetting the surface of the solid particulate plastic or polymer substrates to form a film of liquid thereon.

The surfaces of the solid plastic particles must then be wetted to form a film of liquid theron, see FIG. 2. Water is a suitable liquid but generally must be treated with wetting agents or solvents to cause wetting of the solid plastic surfaces which are generally hydrophobic. Applicants have found lignin liquor extract (solutions of neutralized lignosulfonates) to be an especially suitable liquid for wetting the substrates. Solutions of various sodium silicates are also contemplated as suitable. There is an additional benefit in the use of lignin liquor extracts and sodium silicates in that they also serve as a temporary binder hardening on drying. There exist a large number of chemicals generally known as surface active agents (surfactants) that help liquids to wet surfaces. The wetting of the solid plastic or polymer substrate particles may be by blending the particles with the liquid and then recovering the wetted particles from the blender or mixer.

As chemical agents for coating the particles of polymer with the refractory materials, use may be made of liquid hydrocarbons, polyalcohols, organic esters, acetates, and so forth in dilute or in suitable liquid states that allow for the penetration of the surface of the polymer in order that the refractory material will be fixed on the surface thereof so as to form the coating in the thickness desired.

It is contemplated that materials that are solvents for the particular substrate will be suitable for enabling wetting of these surfaces either alone or diluted with another liquid. For example, it is known that polystyrenes are soluble in ethyl acetate and acetone.

It is, of course, necessary that the liquid wetting the plastic particle not be so viscous or tacky as to cause agglomeration of the particles sufficient to prevent the subsequent coating with the fine refractory as defined hereafter. Further, the liquid must be easily displaced by the fine refractory such that adjacent refractory particles will abut upon drying. In other words, the film is not an important element of the final coating but is a means of assembling the refractory coating. It is desirable that the liquid be sufficiently viscous to develop a suitably thick liquid film over the substrate surface. To serve to develop a fine refractory coating of the desired thickness, the weight ratio of the liquid for wetting the surfaces of solid substrates to the solid plastic or polymer substrate is from about 1:20 to about 1:5.

The physical properties of the agglomerates and/or individual shells depend on the refractory material utilized, the structure of the plastic and the process followed in the preparation.

The physical strength of the cellular structures and/or individual shells may depend on the refractory material used, on the thickness of the coating by which the particles of the plastic or polymer are covered, on the size and shape of the plastic or polymer used and, on the temperature at which it has been burned in order to develop the sintered ceramic bond.

The refractory materials suitable for coating the wetted substrate are those presently known and possible combinations thereof as well as the raw materials used for preparing their mixtures. Thus, individual shells and/or cellular structures may be prepared with a formulation of, for example, magnesite and chrome ore, forsterite, magnesite, high alumina, and so forth. The finely divided refractory material may be 99% $Al_2O_3$ or 97.3% $SiO_2$ or 99% $MgO$ or 63% $ZrO_2$ or 70% $Al_2O_3$ or any other existing type of refractory material. These examples are illustrative and explanatory and are not intended to limit the scope of the invention.

It is preferred that the refractory be ground to at least all substantially pass 100 mesh Tyler. However, it is contemplated that coarser refractory materials such as all passing 65 mesh will be suitable. Depending on the size of the substrates and the thickness of the film on the wetted substrate, the coarser portion of the particles may not adhere to the substrate. Hence, while the invention may be practiced with coarser materials, the refractory materials, if too coarse, may be wasted. Preferably, the refractory material is dry prior to blending with the wetted substrates. But, a small amount of moisture depending on the size of the refractory and the composition thereof may not be detrimental.

For preparing individual shells, sufficient fine refractory must be added at least to coat all the surfaces to a thickness that the liquid on the substrate will permit and at least to form a coating of generally abutting refractory particles. For example, it is expected that one cubic foot of expanded polystyrene beads about minus 9 mesh Tyler wetted with a solution of lignin liquor diluted with water should be mixed with approximately 25 pounds of minus 100 mesh Tyler high purity alumina in order to form a high purity alumina coating thereover. The precise ratio of fine refractory materials to plastic substrate of a given area can be developed for a given combination with a minimum of simple experimentation.

A small amount of a hydraulic cement may be advantageously added to the fine refractory where chemically compatible to provide additional binder in the shell.

Where cellular agglomerates are sought, additional fine refractory may be added either initially or after coating the substrates. In other words, more fine refractory than is needed to just coat the substrates may be added. Additional liquid, for example, 2 to 10% water based on the weight of the fine refractory will cause the agglomerating of the individual shells.

Figure 3:
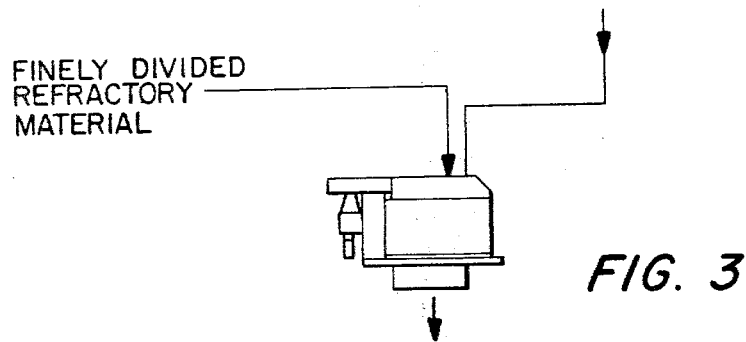
FIG. 3 illustrates a mixer or blender used in the step of mixing the wetted substrates with at least sufficient finely divided refractory material to form a refractory coating thereon comprising generally abutting refractory particles.

Mixing the wetted solid plastic substrate with the fine refractory may take place in a mixer or blender that will not crush the substrates, see FIG. 3. A tumbling blender such as a Munson mixer is quite suitable. The mixer must provide sufficient mixing action to allow the substrates to be separated from each other and the surfaces of the substrates to contact sufficient fine refractory to form a coating. Preferably, the mixing only continues until the coatings have been formed and/or agglomerates have been formed. After mixing the wetted substrate with the fine refractory, the excess refractory may be screened from the coated substrate whether or not agglomerates have been formed, see FIG. 4.

The coatings forming shells and where agglomerated forming cellular or honeycomb structures may be dried in air at room temperature or at a temperature below which the plastic or polymer substrate melts. Thereafter, the coatings may be heated to a temperature to remove the solid plastic and form a sintered ceramic bond. No particular firing schedule need be maintained. The highest temperature used in the firing process will, of course, depend on the refractory materials used to form the coating. The individual shells or agglomerated cellular structures may be burned in saggars placed on continuous kiln cars. If the shells and cellular structures when dried have sufficient strength and a binder that will not burn away at low temperatures, they may be burned by passing through a rotary kiln or the like. This would, of course, be a preferred way to produce large volumes of refractory raw materials according to this invention. The binder most likely to permit the burning of refractory raw materials in continuous rotary type kilns is a calcium aluminate cement.

The refractory raw materials as described herein may be used as an addition to refractory product batches.

For some purposes, it may be desirable to crush the cellular structures to form smaller size cellular structures prior to incorporating in the refractory product batch, for example, a brickmaking batch or castables batch.

Where binders that are not water soluble are used in the preparation of shells, the surfaces can be rewet and an additional layer of refractory material applied thereto. Recycling of the coated substrates through the process enables the thickness to be gradually built as desired. We have found that without recycling the shell thickness will range between 20 and 150 microns averaging about 50 microns. In order to make refractory shapes, size grading of refractory product batches is well understood in the art. For example, there exist continuous grinds and gap grinds or graduations. Typically, brickmaking batches comprise gap gradations in which the raw materials are sized, for example, as follows:

25 to 35% 4 on 10 mesh Tyler
25 to 35% 10 on 28 mesh Tyler
30 to 50% fines; that is, all passing 65 mesh Tyler.

The foregoing gap grind has no materials intentionally in the 28 or 65 mesh gap. Gap grinds result in products with well filled out matrices and are known for optimum density. The shells or cellular structures produced according to this invention may replace part or all of the coarse fraction of the gap grinds if a product having a dense matrix and large voids is desired. It is also possible to use the shells or cellular structures as a portion of or as all of the coarse part of a continuous gradation mix where a less tightly knitted matrix is acceptable or desired.

When it is desired that the refractory product be of a single composition, chemically speaking, the composition of the fine refractory used to form the shells or cellular structures will be the same as the remainder of the materials used in the refractory product batch. However, it may be acceptable (or even desirable) that the composition of the shells or cellular structures differ from the remaining ingredients of the refractory product batches.

Utilizing aluminum oxide of more than 99% purity and a grain analysis of minus 100 mesh Tyler, different types of spherical hollow pellets were obtained following the steps of the above detailed process. A variation was carried out of the ratio of the contents of solid plastic or polymer substrate in the mixture to the refractory material. Once burned, the shells become individual hollow spheres.

Equally, we have obtained cellular structures of refractory materials with a 79% pure oxide magnesium, 94.7% pure magnesium oxide and 94.15% pure aluminum oxide. In these trials we used as a substrate an expanded polystyrene in solid grain, polyethylene in solid grain and so forth.

Having described the invention with the detail and particularity as required by the Patent Laws, what is desired to be protected by Letters Patent is set forth in the following claims.

We claim:

1. A process for making lightweight refractory material comprising the sequence of the following steps:
   (A) choosing the size of the solid plastic or polymer substrate particles;
   (B) wetting the surface of solid particulate plastic or polymer substrates to form a film of liquid thereon, wherein the weight ratio of liquid for wetting the surface of the solid substrate to the solid substrate is from about 1:20 to about 1:5;
   (C) mixing the wetted substrates with at least sufficient finely divided refractory materials to form a refractory coating thereon comprising generally abutting refractory particles;
   (D) separating the coated substrates from any excess refractory material;
   (E) drying said coated substrates to remove the film of liquid;
   (F) recovering a refractory material substantially comprising individual refractory coated substrates; and
   (G) heating the recovered refractory coated substrates to remove the plastic substrates and to develop a sintered ceramic bond and recovering empty ceramically bonded refractory shells having a shell thickness in the range of between 20 and 150 microns and an average wall thickness of about 50 microns.

2. A process according to claim 1 in which the liquid film contains a binder.

3. A process according to claim 1 in which the solid plastic or polymer substrate comprises chosen sizes of particles comprising the following gradation:
   100%: 3 on 4 mesh Tyler 100%: 4 on 8 mesh Tyler
100%: 8 on 10 mesh Tyler
100%: 10 on 28 mesh Tyler
or a mixture of these particles having different sizes.

4. A process according to claim 1 in which the added refractory materials are ground to substantially all pass 100 mesh Tyler.

5. A product according to the process of claim 1.

6. A process according to claim 1, in which the finely divided refractory materials, is 99% $Al_2O_3$ or 97.3% $SiO_2$ or 99% MgO or 63% $ZrO_2$ or 70% $Al_2O_3$.

7. A process for making lightweight refractory products comprising the sequence of the following steps:
(A) choosing the size of the solid plastic or polymer substrate particles;
(B) wetting the surface of solid particulate plastic or polymer substrates to form a film of liquid thereon, wherein the weight ratio of liquid for wetting the surface of the solid substrate to the solid substrate is from about 1:20 to about 1:5;
(C) mixing the wetted substrates with at least sufficient finely divided refractory materials to form a refractory coating thereon comprising generally abutting refractory particles;
(D) separating the coated substrates from any excess refractory material;
(E) drying said coated substrates to remove the film of liquid;
(F) recovering a refractory material substantially comprising individual refractory coated substrates and an average wall thickness of about 50 microns;
(G) heating the recovered refractory coated substrates to remove the plastic substrates and to develop a sintered ceramic bond and recovering empty ceramically bonded refractory shells having a shell thickness in the range of between 20 and 150 microns;
(H) preparing a refractory product batch incorporating said cellular material;
(I) forming a refractory product from said batch; and
(J) heating the formed refractory product to develop a ceramic bond.

8. A product according to claim 7.